United States Patent [19]
Ohyama

[11] Patent Number: 5,587,637
[45] Date of Patent: Dec. 24, 1996

[54] ROBOT ARM DEVICE CAPABLE OF CONVEYING AN ARTICLE IN CIRCUMFERENTIAL AND RADIAL DIRECTIONS

[75] Inventor: Keishi Ohyama, Kasaoka, Japan

[73] Assignee: Tatsumo Kabushiki Kaisha, Okayama-ken, Japan

[21] Appl. No.: 365,653

[22] Filed: Dec. 29, 1994

[30] Foreign Application Priority Data

Jan. 10, 1994 [JP] Japan .................................. 6-000864

[51] Int. Cl.$^6$ ........................................ B25J 9/18
[52] U.S. Cl. ................................ 318/568.11; 318/568.2; 318/568.21; 901/27; 901/23; 901/2
[58] Field of Search .................... 318/568.11, 568.12, 318/568.2, 568.21; 901/15, 2, 23, 27, 30, 19, 21, 20; 364/474.02; 74/479 B, 479 BP, 479 BJ; 414/4

[56] References Cited

U.S. PATENT DOCUMENTS

| | | | |
|---|---|---|---|
| 3,826,383 | 7/1974 | Richter | .................................. 901/15 X |
| 4,507,046 | 3/1985 | Sugimoto et al. | ..................... 901/15 X |
| 4,806,066 | 2/1989 | Rhodes et al. | ......................... 901/21 X |
| 4,897,015 | 1/1990 | Abbe et al. | ........................... 901/15 X |

Primary Examiner—Karen Masih
Attorney, Agent, or Firm—Jordan and Hamburg

[57] ABSTRACT

A robot arm device includes an expandable arm portion including an arm member, a forearm arm member, and a hand member. The arm member is fixedly attached with an arm drive wheel which is driven by a first drive motor. The arm member carries a transmission wheel disposed coaxially with the arm drive wheel and rotatable independently from the arm drive wheel and a forearm drive wheel disposed at a leading end of the arm member and rotatable independently from the arm member and fixedly connected at a base end of the forearm member. The forearm member carries a stationary wheel disposed coaxially with the forearm drive wheel and fixedly connected with the arm member and a hand drive wheel disposed at a leading end of the forearm member. The forearm drive wheel is drivingly rotated by a second drive motor in addition to a relative rotation due to a rotation of the arm member. A controller controls the first and second drive motors to rotate the first drive motor in a specified direction and rotate the second motor in the opposite direction at such an angular speed as to rotate the forearm drive wheel twice faster than the arm drive wheel in combination with the relative rotation of the forearm drive wheel.

7 Claims, 6 Drawing Sheets

ROBOT ARM DEVICE CAPABLE OF CONVEYING AN ARTICLE IN CIRCUMFERENTIAL AND RADIAL DIRECTIONS

BACKGROUND OF THE INVENTION

This invention relates to a robot arm device which is capable of conveying an article such as wafer in circumferential and radial directions.

There have been proposed a number of robot arm devices. In the Japanese magazine "ELECTRONIC MATERIAL", August, 1991, for example, a robot arm device shown in FIG. 8 is disclosed. This robot arm device is employed in a conveying apparatus for conveying wafers as material of semiconductor memories to a specified processing section.

This conventional robot arm device basically includes a base portion 20, a base drum 310 rotatably supported on the base portion 20, and an arm portion 10. The arm portion 10 mainly consists of an arm member 110, a forearm member 120, and a hand member 130. These members are rotatably connected with one another. The hand member 130 is adapted for carrying or gripping a wafer at its leading end, and is enabled to make a linear movement.

The robot arm device is further provided with a drum drive motor 40 for changing the circumferential position of the hand member 130 and an arm drive motor 50 for changing the radial position of the hand member 130, that is, linear movement of the hand member 130.

Specifically, a support shaft 440 extends vertically upward substantially from a center of the base portion 20. A vertically long pulley 430 is mounted rotatably about the support shaft 440. An axis of the support shaft 440 agrees with an axis of the base drum 310. The pulley 430 is fixedly attached with a bottom portion of the base drum 310. Accordingly, the base drum 310 is rotatable about the axis of the support shaft 440. At a center of a top portion of the base drum 310 is fixedly attached a transmission pulley 360. An axis of the transmission pulley 360 agrees with the axis of the base drum 310. The stationary pulley 360 is rotatable together with the base drum 310.

The drum drive motor 40 is mounted on the base portion 20, and an output pulley 420 is mounted on an output shaft 410 of the drum drive motor 40. Another transmission shaft 450 extends vertically upward from the base portion 20, and pulleys 450 and 460 are mounted rotatably on the transmission shaft 450. A drive belt 60 is mounted between the output pulley 420 and the pulley 460 and a belt 610 is mounted between the pulley 470 and the pulley 430.

The arm drive motor 50 is mounted on an outer periphery of the base drum 310, and an output pulley 520 is securely mounted on an output shaft 510 of the arm drive motor 50. A bracket 580 is fixedly attached on the base drum 310 at a position opposed to the arm drive motor 50. A transmission shaft 550 is mounted on the bracket 580 rotatably about its longitudinal axis. Pulleys 560 and 570 are mounted on the transmission shaft 550.

An arm drive shaft 340 extends along the axis of the base drum 310. The arm drive shaft 340 is rotatable independently from the base drum 310 and the transmission pulley 360. Specifically, an upper portion of the arm drive shaft 340 projects upward through the top portion of the base drum 310. An arm drive pulley 530 corresponding to the pulley 570 is mounted at the bottom end of the arm drive shaft 340, and windows 590 are formed in the periphery wall of the base drum 310 at positions opposed to the pulleys 530 and 570. A drive belt 70 is mounted between the drive pulley 520 and the pulley 560, and a belt 710 is mounted between the pulleys 570 and 530 through the windows 590.

A top of the arm drive shaft 340 is fixedly attached with a base end of the arm member 110. At a leading end of the arm member 110, a forearm drive shaft 350 which extends in parallel with the arm drive shaft 340 is mounted through the arm member 110 in such a way that the forearm drive shaft 350 is rotatable independently from the arm member 110. A forearm drive pulley 370 is integrally mounted at a bottom end of the forearm drive shaft 350. An intermediate stationary pulley 380 is fixedly attached on the arm member 110. It should be noted that the forearm drive shaft 350 is independent from the stationary pulley 380. An axis of the intermediate stationary pulley 380 agrees with the axis of the forearm drive shaft 350.

A base end of the forearm member 120 is fixedly mounted on an upper end of the forearm drive shaft 350, and a hand drive shaft 330 which extends in parallel with the forearm drive shaft 350 is mounted at a leading end of the forearm member 120. The hand drive shaft 330 extends through the forearm member 120 in such a way that the hand drive shaft 330 is rotatable independently from the forearm member 120. A hand drive pulley 390 is integrally mounted at a bottom end of the hand drive shaft 330 and the hand member 130 is integrally mounted at an upper end of the hand drive shaft 330.

The distance between an axis of the arm drive shaft 340 and an axis of the forearm drive shaft 350 is set to be the same as that between the axis of the forearm drive shaft 350 and an axis of the hand drive shaft 330.

A first belt 3670 is mounted between the stationary and forearm drive pulleys 360 and 370, and a second belt 3890 is mounted between the intermediate stationary and hand drive pulleys 380 and 390.

The ratio of the diameter of the transmission pulley 360 to that of the forearm drive pulley 370 is set at 2:1 and the ratio of the diameter of the intermediate stationary pulley 380 to that of the hand drive pulley 390 is set at 1:2.

When changing the circumferential position of the hand member 130 or rotating the arm portion 10, the drum drive motor 40 is driven while the arm drive motor 50 is suspended. Specifically, a torque of the drum drive motor 40 which is driven in a clockwise or counterclockwise direction is transmitted to the base drum 310 by the way of the output shaft 410, pulley 420, belt 60, pulley 460, pulley 470, belt 610, and the pulley 430, thereby rotating the base drum 310 in a clockwise or counterclockwise direction. The base drum 310 integrally carries the arm portion 10, the arm drive motor 50, and the other parts. Accordingly, the clockwise or counterclockwise rotation of the base drum 310 rotates the arm portion 10 in a clockwise or counterclockwise direction.

When changing the radial position of the hand member 130 or straightly moving the hand member in radial directions, on the other hand, the arm drive motor 50 is driven while the drum drive motor 40 is suspended. A torque of the arm drive motor 50 which is driven in a specified direction is transmitted to the arm drive pulley 530 by the way of the output shaft 510, the output pulley 520, the drive belt 70, the pulley 560, the transmission shaft 550, the pulley 570, and the belt 710, and further transmitted to the arm member 110 by the way of the arm drive shaft 340.

In the case of contracting the arm portion 10, in other words, moving the hand member 130 inward, the arm drive motor 50 is driven in a clockwise direction, and the arm member 110 is rotated in a clockwise direction, the forearm drive shaft 350 moves in a clockwise direction about the axis of the arm drive shaft 340, and at the same time the forearm drive pulley 370 rotates in a counterclockwise direction.

Specifically, the contact portions of the first belt 3670 with the stationary and forearm drive pulley 360 and 370 shift in a counterclockwise direction with the clockwise rotation of the arm member 110. In this time, however, the transmission pulley 360 does not rotate together with the rotation of the arm member 110 because of being fixedly attached on the base drum 310 and independent from the arm drive shaft 340. Accordingly, the counterclockwise shift of the contact portions of the first belt 3670 will cause the forearm drive shaft 350 to rotate in a counterclockwise direction. The counterclockwise rotation of the forearm drive shaft 350 is twice faster than the rotation of the arm member 110 because the diameter of the forearm drive pulley 370 is a half of that of the transmission pulley 360.

Consequently, the forearm member 120 rotates in a counterclockwise direction about the axis of the forearm drive shaft 350 twice faster than the arm member 110. In similar to the rotation of the arm member 110, the counterclockwise rotation of the forearm member 120 causes a clockwise shift of the second belt 3890 because the intermediate stationary pulley 380 is fixedly attached to the arm member 110 and does not rotate together with the forearm member 120. This shift of the second belt 3890 causes a clockwise rotation of the hand drive pulley 390, the hand drive shaft 330, and the hand member 130. The hand member 130 rotates in a clockwise direction at an angular speed half of that of the forearm member 120 because the diameter of the hand drive pulley 390 is twice greater than that of the intermediate stationary pulley 380.

Consequently, the combination of the clockwise rotation of the arm member 110, the double angular speed counterclockwise rotation of the forearm member 120, and the clockwise rotation of the hand member 130 will straightly move the hand member 130 in an inward radial direction.

In the case of expanding the arm portion 10, i.e., moving the hand member 130 outward, the arm drive motor 50 is driven in a counterclockwise direction. Thereafter, each part moves in the reverse direction to the contraction of the arm portion 10, and the hand member 130 will be straightly moved in an outward direction.

in this conventional robot arm device, the expansion and contraction of the arm portion 10 is executed only by the use of the arm drive motor 50. The forearm member 120 and the hand member 130 are rotated owing to the relative shift of the first and second belts 3670 and 3890. Also, the double speed rotation of the forearm member 120 is attained by the half diameter of the forearm drive pulley 370 relative to the transmission pulley 360.

Accordingly, the forearm drive shaft 370 produces the rotating force to rotate the forearm member 120 carrying the hand member 130 not much than a half comparing to a belt mechanism where the forearm drive shaft 370 would have a diameter equal to or greater than the transmission pulley 360. It will be seen that to rotate the forearm member 120 carrying the hand member 130, a considerable big torque is necessary. It is impossible to increase the diameter of the forearm drive pulley 370 because of the radial straight movement. Accordingly, there is no way but increasing the output torque of the arm drive motor 50 to raise the forearm member rotating torque, which needs a more expensive motor. Thus, the production costs will rise.

Also, the forearm drive pulley 370 whose diameter is smaller than the stationary pulley 360 has smaller belt contact area than the stationary pulley 360. A slippage will be likely to occur between the forearm drive pulley 370 and the belt 3670. This will also reduce the torque to rotate the forearm member 120.

Further, it will be apparent that the radial straight movement of the hand member 130 is accomplished by a very finely accurate geometric combination of the arm members, shaft, pulleys, and belts. If there is a dimensional error in one part, it will be impossible to attain the accurate straight radial movement. However, it is impossible to perfectly machine each part into a theoretically required dimension. Accordingly, there is no way but allowing some error or displacement. Also, long use of this device results in some mechanical deformations, and consequently increase such error. Accordingly, there has been the long demand of solving this problem.

Furthermore, in this robot arm, the arm portion 10 is rotated in a circumferential direction by rotating the base drum 310 carrying the arm portion 10 and the arm drive motor 50 with the drum drive motor 40. Accordingly, a considerable big load is applied to the drum drive motor 40. This needs a motor capable of generating a great torque, and then raise the production costs.

Japanese Unexamined Utility Model Publication No. 62-150087 discloses another robot arm device whose construction is basically identical to that of the above-mentioned robot arm device. However, circumferential movement or rotation of an arm portion is accomplished by rotating both an arm member and a forearm member carrying a hand member at a timed relation with each other, instead of rotating of the base drum 310 carrying the arm drive motor 50 and the arm portion 10 as mentioned in the above-mentioned robot arm device.

Specifically, there is provided a forearm driving mechanism in addition to an arm driving mechanism. The arm driving mechanism is substantially identical to that of the above-mentioned robot arm device which mainly consists of the arm drive motor 50 and the arm drive shaft 340 fixedly attached with the arm member 110.

The forearm driving mechanism includes a forearm drive motor, an output shaft of the motor, a first output pulley fixedly attached to the output shaft, a first transmission pulley driving connected with the first output pulley by belt, and a second transmission pulley driving connected with a forearm drive pulley by a belt.

The second transmission pulley is equivalent of the transmission pulley 360 of the above robot arm device. The second transmission pulley is fixedly connected with the first transmission pulley. An axis of these transmission pulleys agrees with an axis of the arm drive shaft. The diameter of the first and second transmission pulleys is twice greater than that of the forearm drive pulley, and also twice greater than that of the output pulley.

Further, on the output shaft of the forearm drive motor is fixedly attached a second output pulley. On the output shaft of the arm drive motor, on the other hand, is fixedly attached a third transmission pulley. The second output pulley is drivingly connected with the third transmission pulley. The second output pulley has the same diameter as the first output pulley and the third transmission pulley has the same diameter as the first and second transmission pulleys. Accordingly, the diameter ratio between the second output pulley and the third output pulley is 1:2.

In this robot arm device, when the entirety of the arm portion is rotated in a circumferential, the forearm drive motor is driven while the arm drive motor is suspended. A torque of the forearm drive motor is transmitted to the arm member by one way of the output shaft, second output pulley, and arm drive shaft. This torque transmission rotates the arm member carrying the forearm and hand member in a direction identical to that of the forearm drive motor at an angular speed half of that of the forearm drive motor.

Also, the torque of the forearm drive motor is transmitted to the forearm member by one way of the output shaft, first output pulley, first and second transmission pulley, and forearm drive pulley. This torque transmission rotates the forearm member carrying the hand member in a direction identical to that of the forearm drive motor and the arm member. In this case, the forearm drive pulley receives a torque which would rotate the forearm member in the identical direction twice faster than the forearm member. However, the half angular speed rotation of the arm member cause a half angular counter rotation due to the relative shift of the belt. Accordingly, the forearm member will not rotate with respect to the arm member. In this way, the arm member is rotated in a circumferential direction without any expansion or contraction of the arm portion.

Comparing to the above-mentioned robot arm device, this robot arm device is advantageous in the aspect of loads applied to a motor for rotating an arm portion in a circumferential direction. Specifically, the mechanism of rotating the base drum 310 carrying the arm drive motor 50 and the arm portion 10 is replaced with the mechanism of rotating the arm member and the forearm member carrying the hand member. In other word, the drum drive motor 40 is replaced with the forearm drive motor.

However, this robot arm device is provided with the forearm drive pulley whose diameter is half smaller than that of the second transmission pulley. Also, the straight radial movement of the hand member is performed by the arm drive motor only. The problems which there have been in the above-mentioned robot arm device have not yet solved.

SUMMARY OF THE INVENTION

It is an object of the present invention to provide robot arm device which has overcome the problems residing in the prior art.

It is another object of the present invention to provide a robot arm device which is simple in construction and is capable of accomplishing a straight radial movement of a hand member accurately for a long time of period at a reduced cost.

The present invention is directed to a robot arm device comprising: an expandable arm portion including an arm member, a forearm arm member, and a hand member; an arm drive wheel fixedly connected at a base end of the arm member; a transmission wheel disposed coaxially with the arm drive wheel and rotatable independently from the arm drive wheel; a forearm drive wheel disposed at a leading end of the arm member and rotatable independently from the arm member and fixedly connected at a base end of the forearm member; a stationary wheel disposed coaxially with the forearm drive wheel and fixedly connected with the arm member; a hand drive wheel disposed at a leading end of the forearm member, and rotatable independently from the forearm member, and fixedly connected at a base end of the hand member, and having a diameter twice greater than the stationary wheel, and an axis of the hand drive wheel being spaced from an axis of the stationary wheel the same distance as an axis of the forearm drive wheel is spaced from an axis of the arm drive wheel; a first drive motor operable to rotate the arm drive wheel; a second drive motor operable to rotate the forearm drive wheel; a first endless member wound on the transmission wheel and the forearm drive wheel; a second endless member wound on the stationary wheel and the hand drive wheel; and a controller operable to control the driving of the first and second drive motors to: rotate the first and second drive motors at the same direction to thereby rotate the arm portion in a specified circumferential direction; and rotate the first drive motor in a specified direction and rotate the second motor in the opposite direction at such an angular speed as to rotate the forearm drive wheel twice faster than the arm drive wheel by way of the transmission wheel and the first endless member in combination with a relative rotation of the forearm drive wheel owing to the rotation of the arm member to thereby move the hand member straightly in a radial direction.

With thus constructed robot arm device, to move the hand member in a specified radial direction, the two drive motors are driven. Specifically, the first drive motor is driven in a specified direction to rotate the arm member. At the same time, the second motor is driven in the opposite direction at such an angular speed as to rotate the forearm drive wheel twice faster than the arm drive wheel in combination with the relative rotation of the forearm drive wheel. In other words, the angular speed of the forearm drive motor can be adjusted so that the forearm member rotates twice faster in the opposite direction than the arm member 11. Accordingly, the dimensional error can be more easily compensated which would have been caused in the machining and assembling or which would be caused due to long use, that is, merely by changing the angular speed of the second motor.

Further, the use of the two drive motors makes it possible to set the diameter of the forearm drive wheel freely without considering the diameter ratio relation with the transmission wheel. Accordingly, this makes it possible to provide a greater forearm drive wheel in diameter than the transmission wheel which gives a greater torque to the forearm member.

It may be preferable to make the forearm drive wheel the same diameter as the transmission wheel. This simplifies the control of the arm and forearm drive motors, and render the transmission and forearm drive wheels in contact with the first endless member on a half of their respective circumferences.

Also, it may be preferable to use pulleys and belt for the arm drive wheel, transmission wheel, forearm drive wheel, stationary wheel, and hand drive wheel, and the first and second endless members. This reduces the weight of the device and the production costs.

It may be appreciated to form the arm member and the forearm member by a box-shaped housing, and provide the transmission wheel and the forearm drive wheel in the housing of the arm member, and provide the stationary wheel and the hand drive wheel in the housing of the forearm member, and enclose the first and second drive motors and the arm drive wheel in a closed housing.

Also, the arm drive wheel may be formed by a cylinder, and rotatably mounted on the housing by way of a bearing and drivingly connected with the first drive motor. Further, there may be provided a drive shaft extending coaxially with the arm drive cylinder and rotatably supported on an inner wall of the arm drive cylinder, and fixedly attached with the transmission wheel at a top end and with a drive wheel drivingly connected with the second drive motor.

Accordingly, all the drive transmission mechanisms are enclosed by the housings, thereby prevent flying of fine dusts which are likely to be produced due to driving of the driving mechanisms.

It may be preferable to control the driving of the first and second drive motors by a pulse signal. This will ensure fine adjustment of the angular speed of the motors.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
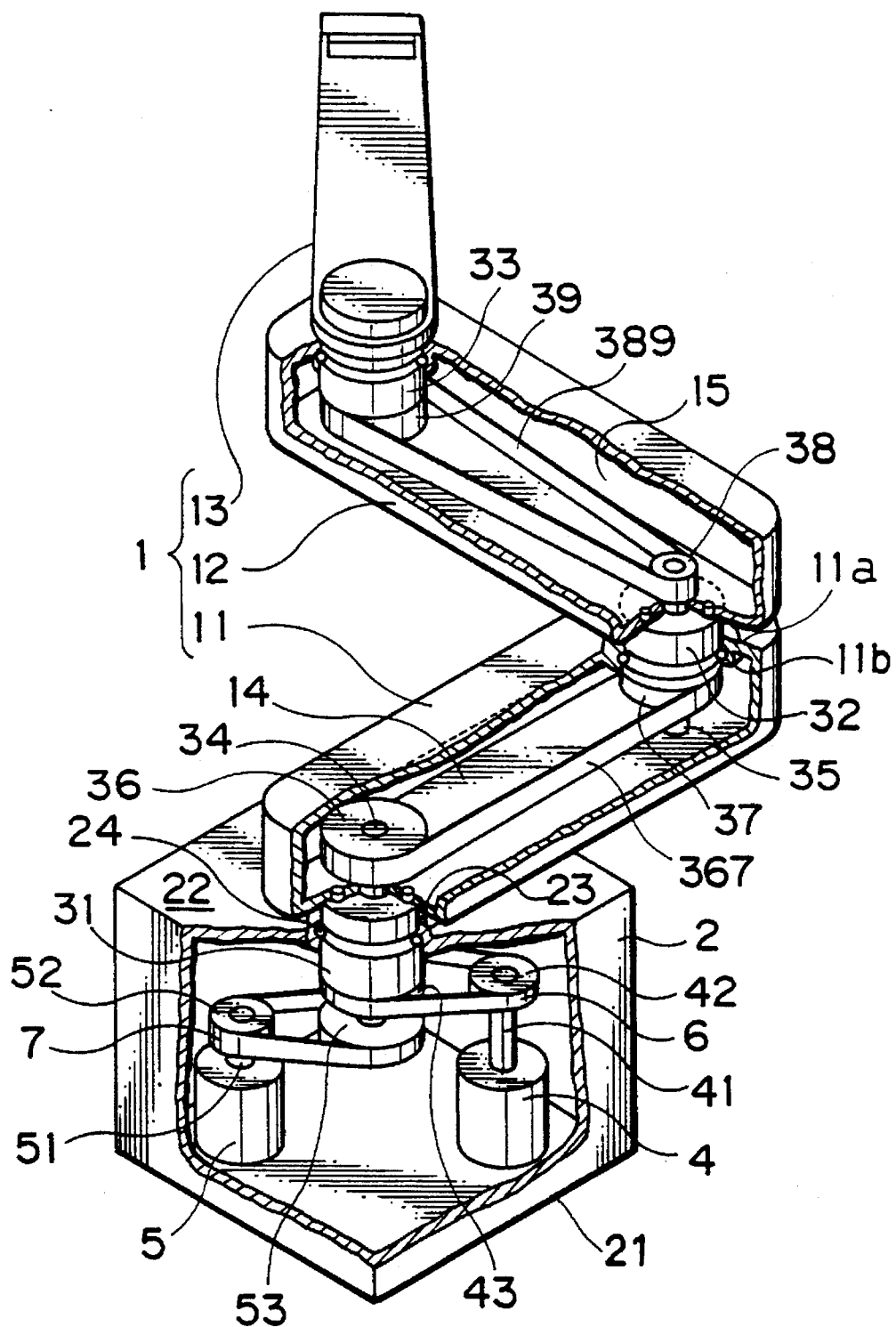
FIG. 1 is a perspective view, partially broken, showing a robot arm device according to the invention.
Figure 2:
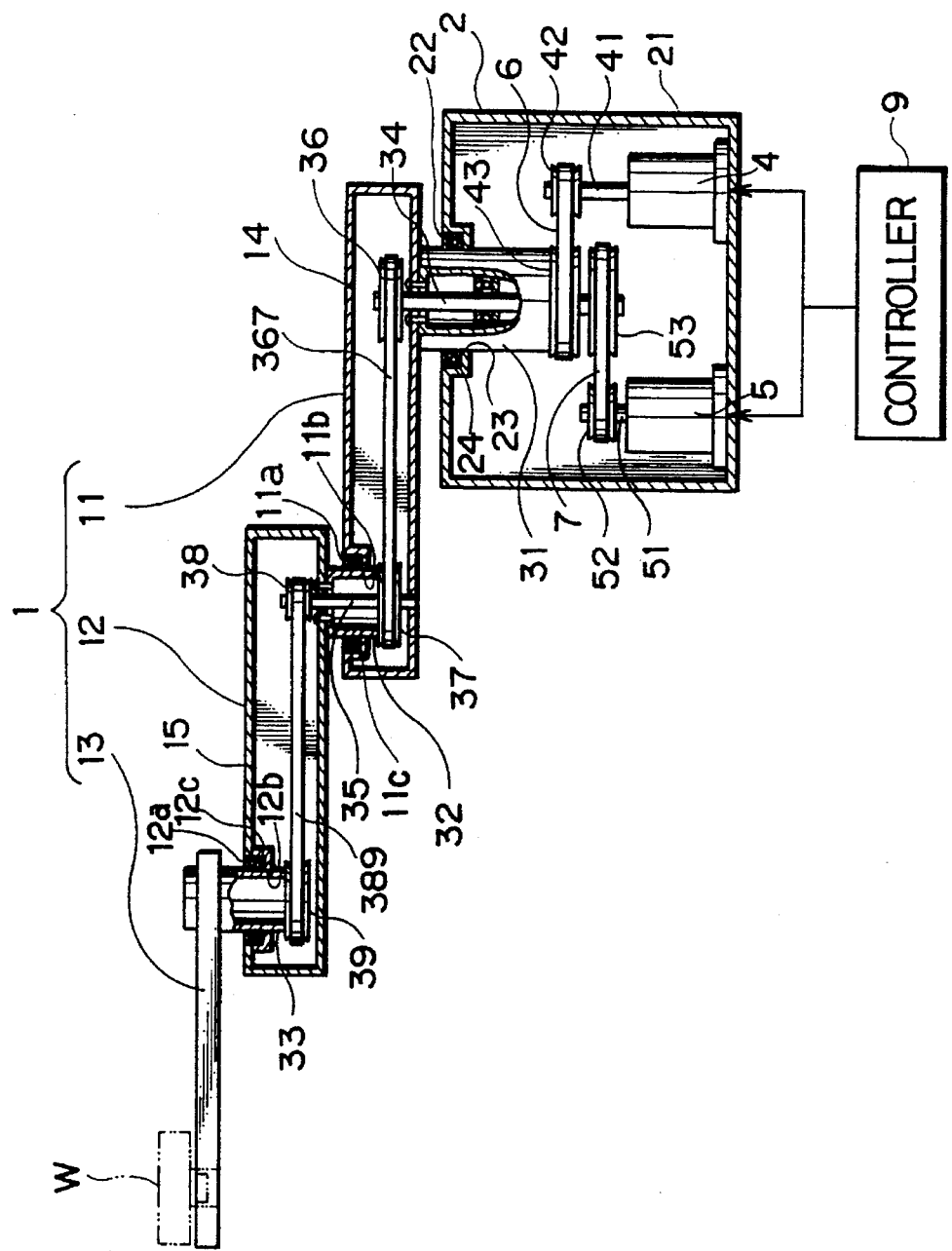
FIG. 2 is a vertical sectional view of the robot arm device.

FIG. 1 is a perspective view, partially broken, of a robot arm device according to the invention, and FIG. 2 is view in a vertical section of the robot arm device. The illustrated robot arm device is used to convey a wafer for semiconductor production.

As shown in FIGS. 1 and 2, this robot arm device has a basic structure consisting essentially of an expandable arm portion 1 which is adapted to convey wafers in circumferential and radial directions of the device, and a base portion 2. The arm portion 1 is expandable and contractible in radial directions of the device.

The arm portion 1 includes an arm member 11, a forearm member 12, and a hand member 13. As described in detail later, a base end of the arm member 11 is rotatably connected with the base portion 2, and a base end of the forearm member 12 is rotatably connected with a leading end of the arm member 11, and a base end of the hand member 13 is rotatably connected with a leading end of the forearm member 12.

The base portion 2 includes a housing 21 in the form of hollow rectangular box. In the housing 21, there are provided an arm drive motor 4, an arm drive cylinder 31, and a forearm drive motor 5.

The arm drive cylinder 31 is in the form of a hollow cylinder, and is rotatably mounted on a top wall of the housing 21. Specifically, a recess 22 is formed in a center of the top wall of the housing 21. A hole 23 is further formed in the recess 22. The cylinder 31 is placed in the hole 23. The cylinder 31 is formed with a flange. A ball bearing 24 is placed between the flange and the recessed top wall, thereby supporting the cylinder 31 rotatably with respect to the housing 21. The arm drive cylinder 31 is integrally provided with an arm drive pulley 43 on a bottom thereof, and is further fixedly connected with the arm member 11. The arm drive cylinder 31 and the arm drive pulley 43 constitute an arm drive wheel.

A forearm drive shaft 34 is supported on the cylinder 31, but is rotatable independently from the cylinder 31. An axis of the forearm drive shaft 34 agrees with an axis of the cylinder 31. The forearm drive shaft 34 extends upward and downward beyond the cylinder 31, and has a drive pulley 53 on a bottom end thereof and a transmission pulley 36 on a top end thereof. The transmission pulley 36 serves as a transmission wheel. The forearm drive shaft 34 and drive pulley 53 and the transmission pulley 36 constitutes a transmission mechanism.

The arm drive pulley 43 is drivingly connected with an output pulley 42 fixedly attached on an output shaft 41 of the arm drive motor 4 by way of a belt 6. The drive pulley 53 is drivingly connected with an output pulley 52 fixedly attached on an output shaft 51 of the forearm drive motor 5 by way of a belt 7.

The arm member 11 is fixedly attached with the cylinder 31. The arm member 11 includes a housing 14 in the form of a laterally long box. A base bottom surface of the housing 14 is secured on a top surface of the cylinder 31 by means of, e.g., screws. Accordingly, the arm member 11 is rotatable together with the cylinder 31 about the axis of the cylinder 31. The transmission pulley 36 is disposed in the housing 14.

The housing 14 of the arm member 11 rotatably supports a forearm drive cylinder 32 at a leading end thereof. An axis of the drive cylinder 32 is parallel with the axis of the cylinder 31. Specifically, in similar to the arm drive cylinder 31, a recess 11a is formed in the end of a top wall of the housing 14, and a hole 11b is further formed in the recess 11a. The cylinder 32 is placed in the hole 11b. A ball bearing 11c is placed between a flange formed on a periphery of the cylinder 32 and the recessed top wall, thereby supporting the cylinder 32 rotatably with respect to the housing 14. The forearm drive cylinder 32 is integrally provided with a forearm drive pulley 37 on a bottom thereof. The forearm drive pulley 37 is drivingly connected with the transmission pulley 36 by way of a belt 367, a first endless member, e.g., The forearm drive cylinder 32 and the forearm drive pulley 37 constitutes a forearm drive wheel.

Along the axis of the cylinder 32 is provided a stationary shaft 35. The stationary shaft 35 is fixedly supported on the housing 14. It should be noted that the forearm drive cylinder 32 is rotatable independently from the stationary shaft 35. On a top end of the stationary shaft 35 is fixedly attached a stationary pulley 38. The stationary shaft 35 and the stationary pulley 38 constitutes a stationary wheel.

The forearm member 12 is fixedly attached with the cylinder 32. The forearm member 12 includes a housing 15 in the form of a laterally long box. A base bottom surface of the housing 15 is secured on a top surface of the cylinder 32 by means of. e.g., screws. Accordingly, the forearm member 12 is rotatable together with the cylinder 32 about the axis of the cylinder 32. The stationary pulley 38 is disposed in the housing 15.

The housing 15 of the forearm member 12 rotatably supports a hand drive cylinder 33 at a leading end thereof. An axis of the drive cylinder 33 is parallel with the axis of the cylinder 31. In similar to the arm drive cylinder 31 and the forearm drive cylinder 32, a recess 12a is formed in the end of a top wall of the housing 15, and a hole 12b is further formed in the recess 12a. The cylinder 33 is placed in the hole 12b. A ball bearing 12c is placed between a flange formed on a periphery of the cylinder 33 and the recessed top wall, thereby supporting the cylinder 33 rotatably with respect to the housing 15. The hand drive cylinder 33 is integrally provided with a hand drive pulley 39 on a bottom thereof. The hand drive cylinder 33 and the hand drive pulley 39 constitute a hand drive wheel. The hand drive pulley 39 is drivingly connected with the stationary pulley 38 by way of a second endless member, e.g., a belt 389.

The hand member 13 is in the form of a laterally long plate. A base end of the hand member 13 is fixedly attached to a top surface of the hand drive cylinder 33 by screws or welding. The hand member 13 is formed at its leading end with a holding portion for holding a wafer W.

A distance between the axis of the arm drive cylinder 31 and the axis of the forearm drive cylinder 32 is set to be the same as that between the axis of the forearm drive cylinder 32 and the axis of the hand drive cylinder 33. The diameter of the arm drive cylinder 31 is set to be the same as that of the transmission pulley 36. Also, the diameter of the transmission pulley 36 is set to be the same as that of the forearm drive cylinder 32. The diameter of the stationary pulley 38 is set to be half of that of the forearm drive cylinder 32. The diameter of the hand drive cylinder 33 is set to be twice greater than that of the stationary pulley 38. In short, the ratio between the diameter of the transmission pulley 36 and that of the forearm drive cylinder 32 is 1:1. The ratio between the diameter of the forearm drive cylinder 32 and that of the stationary pulley 38 is 2:1. The ratio between the diameter of the stationary pulley 38 and that of the hand drive cylinder 33 is 1:2. These dimensional settings are made to simplify the operation control.

Since the bearings 24, 11c and 12c are provided at positions where the drive cylinders 31, 32, 33 and the housings 21, 14, 15, respectively, the arm member 11, the forearm member 12 and the hand member 13 can be smoothly rotated about the respective axes of the drive cylinders 31, 32, and 33.

Next, expansion and contraction, and rotation of the arm portion 1 of this device will be described. First, a geometric principle of a linear expansion and contraction of the hand member 13 will be described with reference to FIG. 7.

Figure 7:
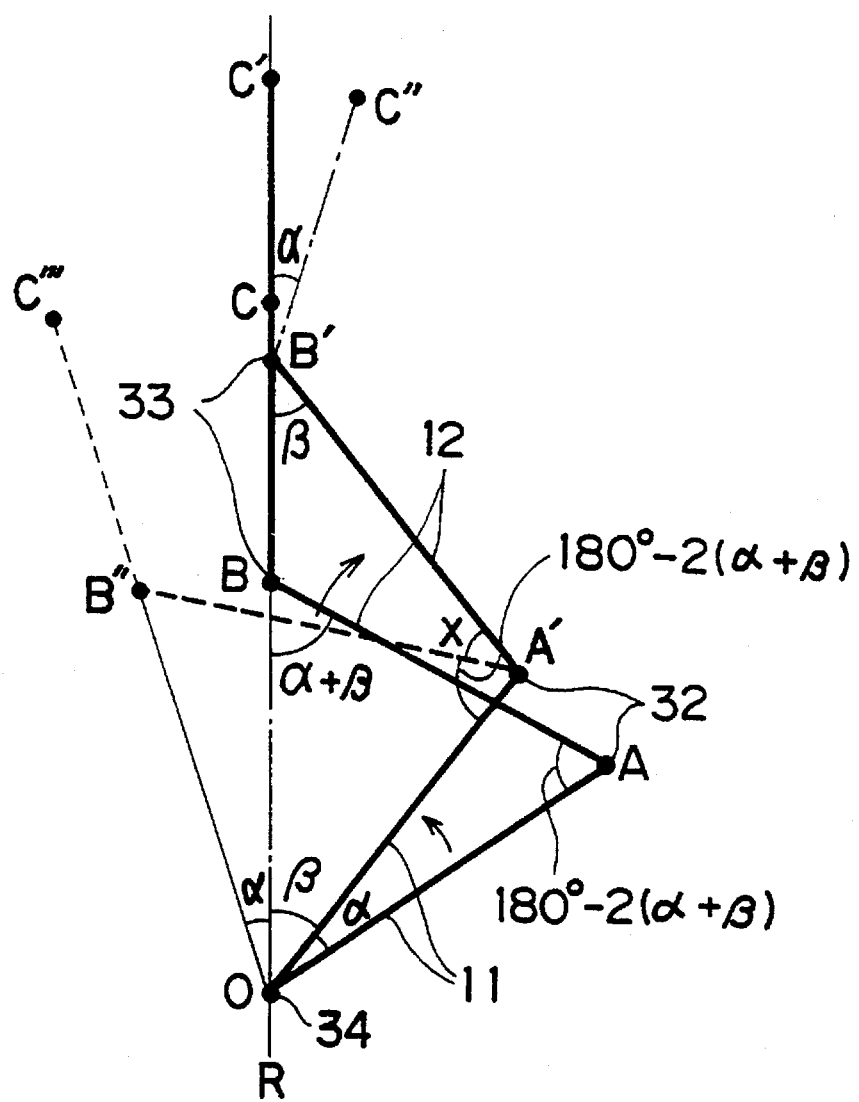
FIG. 7 is a diagram showing a geometric principle of a linear movement of a hand member of the arm portion.
Figure 8:
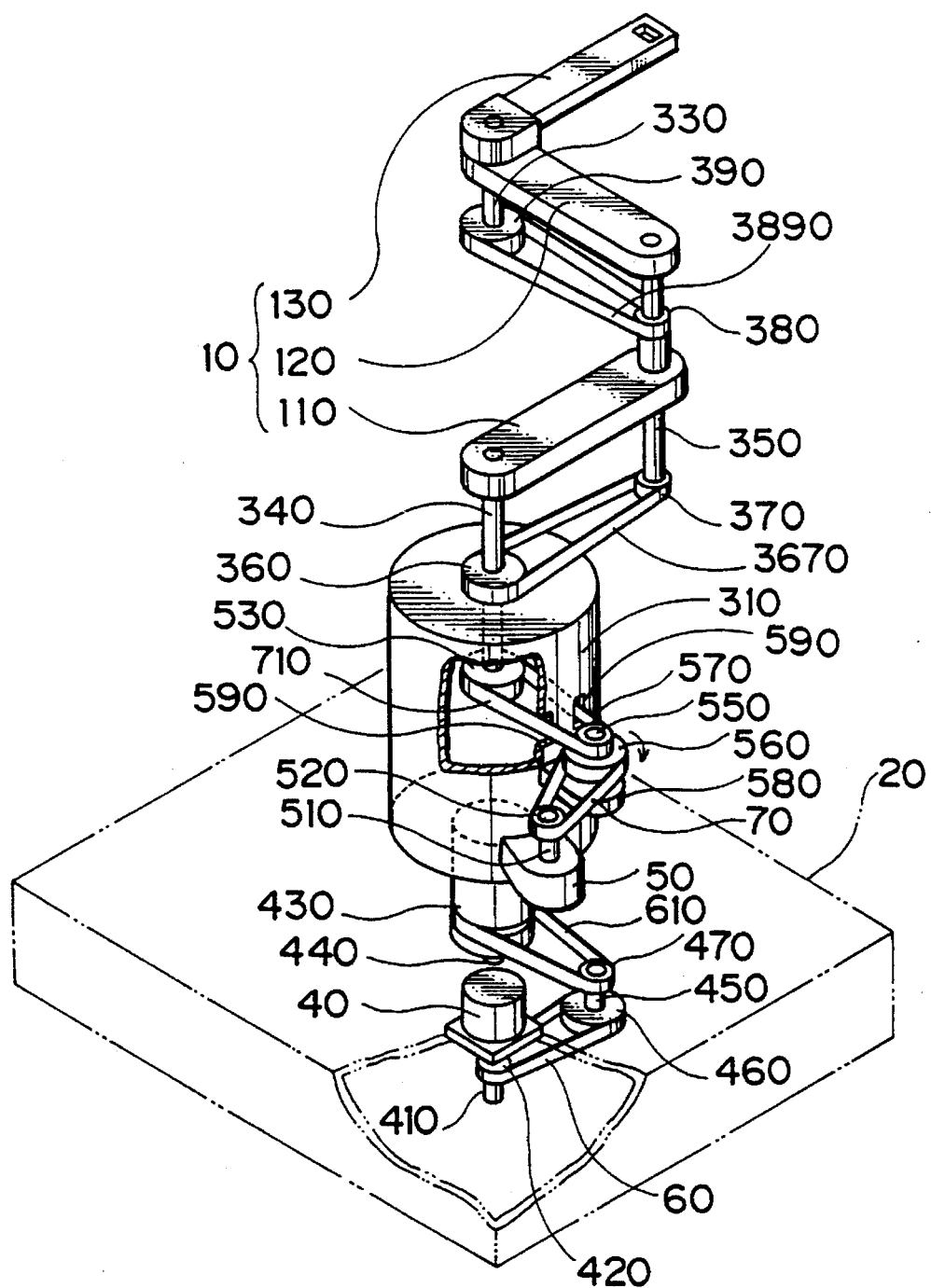
FIG. 8 is a perspective view, partially broken, showing a construction of a conventional robot arm device.

In FIG. 7, the point O represents the axis of the arm drive cylinder 34, the points A and A' represent the axis of the forearm drive cylinder 32, and the points B. B' and B" represent the axis of the hand drive cylinder 33. The points C, C' and C" represent the wafer holding point of the hand member 13. The triangle OAB represents a constructed state where the hand drive cylinder 33 is located closer to the arm drive cylinder 33. The triangle OA'B' represents an expanded state where the hand drive cylinder 33 is located further away from the arm drive cylinder 33. The triangle OA'B" represent an imaginal state where the arm member 11 is rotated in a counterclockwise direction without rotating the forearm member 12 in a clockwise direction.

It will be seen that to retain a linear movement of the hand member 13, the point B' must always move along a specified radial direction which is represented by a phantom line R passing the points O and B. In other words, the angle x between the forearm member 12 of the line segment A'B" (broken line) and the forearm member 12 of the line segment A'B' is 2α. Accordingly, when the arm member 11 is rotated, for example, in a counterclockwise direction by angle α about the point O, the forearm member 12 must be rotated in a clockwise direction by angle 2α about the point A with respect to the arm member 11.

This can be mathematically expressed as follows:
In the triangle OA'B', $$B'OA'+\angle OA'B'+\angle A'B'O=180°$$

Therefore, $$\beta+(180°-2(\alpha+\beta))+x+\beta=180°$$

When this equation is solved for x, x=2α.

Further, the hand member 13 must be rotated in a counterclockwise direction by angle α with respect to the forearm member 12. Unless the hand member 13 is rotated in the counterclockwise direction by angle α, the hand member will come to the position represented by the line segment B'C" in the expanded state of the triangle OA'B'.

It will be apparent that the same principles can be applied to a reverse case where the arm member 11 is in a clockwise direction.

In summary, to attain a linear radial movement of the hand member 13, the forearm member 12 must be rotated in a direction opposite to a rotation of the arm member 11 at a angular speed twice faster than the rotation of the arm member 11, and at the same time the hand member 13 must be rotated in a reverse direction opposite to the rotation of the forearm member 12 at a angular speed a half of that of the rotation of the forearm member 12.

The robot arm device will be operated in accordance with the above-mentioned geometric principle. Specifically, when moving the hand member 13 in an outward radial direction or expanding the arm portion 1, the arm drive motor 4 is driven in a counterclockwise direction. Consequently, the arm drive cylinder 31 is rotated in a counterclockwise direction by way of the output pulley 42, belt 43, and pulley 43. With the counterclockwise rotation of the arm drive cylinder 31, the arm member 11 is rotated in a counter-clockwise direction at a specified angular speed.

According to the above-mentioned principle, the forearm member 12 must be rotated at double angular speed with respect to the arm member 11. In this case, it should be noted that the arm drive cylinder 31, the transmission pulley 36, and the forearm drive member 32 have the same diameter. As mentioned above, this counterclockwise rotation of the arm member 11 moves the forearm drive cylinder 32 in a counterclockwise direction, which will give a relative clockwise rotation to the forearm drive cylinder 32. This relative clockwise rotation has the same angular speed as the counterclockwise rotation of the arm member 11.

To make the angular speed of the forearm member 12 double, it is necessary to give the forearm drive cylinder 32 a further torque which will produce a clockwise rotation having the same angular speed. This torque addition is accomplished by the forearm drive motor 5. Specifically, the forearm drive motor 5 is driven in a clockwise direction. The torque of the forearm drive motor 5 is transmitted to the forearm drive cylinder 32 by way of the output pulley 52, the belt 7, the drive pulley 53, the shaft 34, the transmission pulley 36, and the first belt 367. In this way, the forearm drive cylinder 32 is rotated in the clockwise direction at double angular speed relative to the counterclockwise rotation of the arm member 11.

The clockwise rotation of the forearm member 12 produce relative counterclockwise rotation of the hand drive cylinder 33 owing to the fact that the hand drive cylinder 33 is moved in a clockwise direction. In this case, the hand drive cylinder 33 rotates at a half angular speed of that of the clockwise rotation of the forearm member 12 because of the fact that: 1) the stationary pulley 38 is integrally connected with the arm member 11 by the way of the stationary shaft 35; and 2) the diameter of the stationary pulley 38 is half of that of the hand drive cylinder 33. Accordingly, the angular speed of the counterclockwise rotation of the hand member is the same as that of the counterclockwise rotation of the arm member 11.

In this way, the hand member 13 moves outward along the specified radial line by rotating the arm drive cylinder 31 in the counterclockwise direction and rotating the drive pulley 53 in the clockwise direction at the same angular speed as the counterclockwise rotation of the arm drive cylinder 31.

When moving the hand member 13 in an inward radial direction or contracting the arm portion 1, the arm drive motor 4 is driven in a clockwise direction and the forearm drive motor 5 is driven in a counterclockwise direction. The arm member 11, forearm member 12, and hand member 13 are respectively rotated in reverse directions to straightly move the hand member inward.

When changing the circumferential position of the arm portion 1 or rotating the entire arm portion 1 in a clockwise or counterclockwise direction without expanding or contracting the arm portion 1, the arm drive motor 4 and the forearm drive motor 5 are driven in the same direction at the same angular speed. For example, in the case of rotating the arm and forearm motors 4 and 5 in clockwise directions at the same speed, the arm member 11 is rotated in a clockwise direction. At this time, the forearm drive cylinder 32 tends to rotate in a counterclockwise direction at an identical angular speed owing to the clockwise movement of the forearm drive cylinder 32. However, this counterclockwise rotation of the forearm drive cylinder 32 is hindered by a clockwise torque which is given by the forearm drive motor 5. Accordingly, the forearm member 12 and the hand member 13 are kept from rotating relative to the arm member 11. The arm portion 1 is entirely rotated in a clockwise direction without being expanded or contracted.

Figure 3:
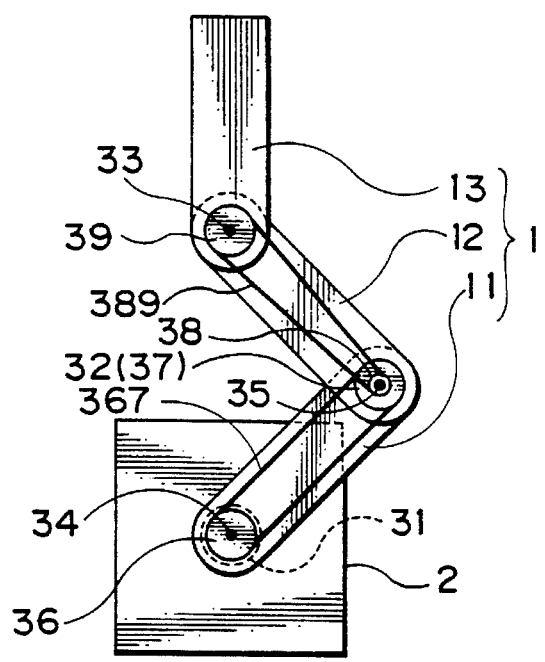
FIG. 3 is a plan view of the robot arm device showing a state where an arm portion of the device is being expanded or contracted.

More specifically, assuming that the state shown in FIG. 3 is an initial position where the arm member 11 inclined in a clockwise direction at 45 degrees with respect to a reference radial line, the forearm member 12 is inclined in a counterclockwise direction at 90 degrees with respect to the arm member 11, and the hand member 13 is on the reference radial line.

Figure 4:
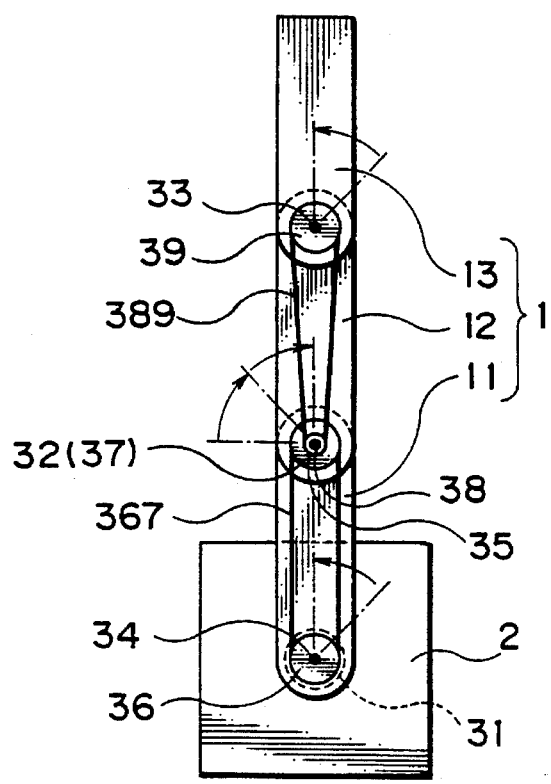
FIG. 4 is a plan view of the robot arm device showing a state where the arm portion is straightened.

When the arm member 11 is rotated in the counterclockwise direction 45 degrees from the initial position, the arm portion 1 comes to the state shown in FIG. 4 where the arm member 11, forearm member 12, and hand member 13 are all on the reference radial line.

Figure 5:
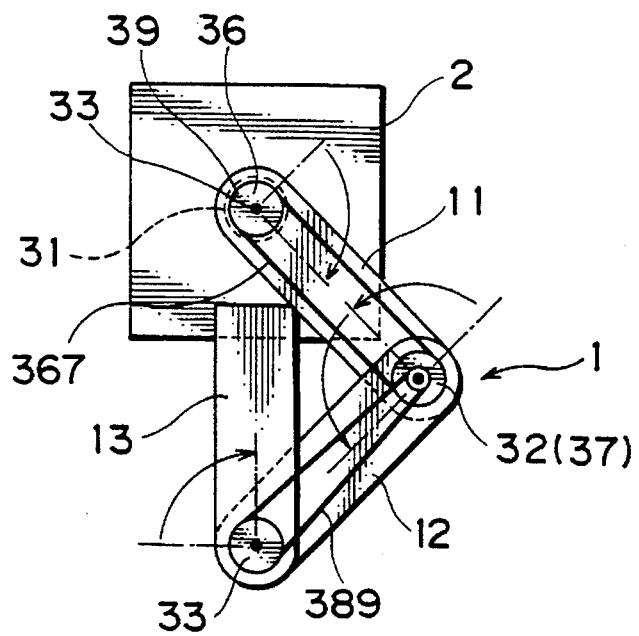
FIG. 5 is a plan view of the robot arm device showing a state where the arm portion is being expanded or contracted at another circumferential position.

When the arm member 11 is rotated in the clockwise direction 90 degrees from the initial position, the arm portion 1 comes to the state shown in FIG. 5 where the forearm member 12 is inclined in the clockwise direction at 90 degrees with respect to the arm member 11 and the hand member 13 is still on the reference radial line.

Figure 6:
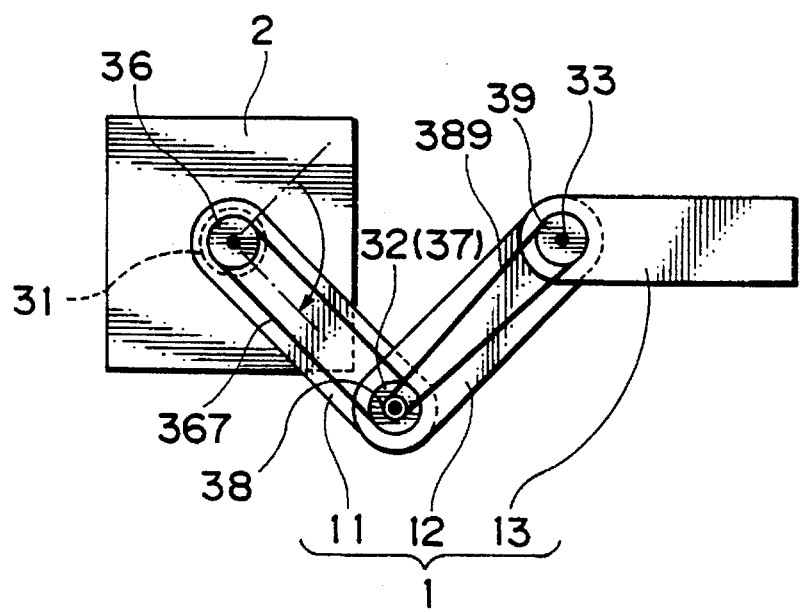
FIG. 6 is a plan view of the robot arm device showing a state where the contracted arm portion is being rotated in a circumferential direction.

When the arm member 11 is rotated in the clockwise direction 90 degrees from the initial state without expanding or contracting the arm portion 1, the arm portion comes to the state shown in FIG. 6 where the hand member 13 is on a new radial line right to the reference radial line.

The arm drive motor 4 and the forearm drive motor 5 are controlled by pulse signals sent from a controller 9. Specifically, the controller 9 sends a control signal to each of the drive motors 4 and 5 to change their respective rotating directions and to adjust their respective rotating speeds.

The rotating speed of the motor 4 or 5 is controlled by pulse signals, specifically, by changing the number of pulses per a specified time. The rotating speed of the arm drive motor 11 is determined based on a required or contraction speed and rotation speed of the arm portion 1. The rotating speed of the forearm drive motor 5 is determined in consideration of the mechanical combination of the drive shaft, pulleys, belts, and drive cylinders.

Specifically, before a ture operation, the arm portion 1 is testingly expanded or contracted to check or measure a displacement in the radial movement of the hand member 13 with respect to the reference radial line. A displacement of the hand member 13 with respect to the reference radial line can be seen to reflect an error in the mechanical combination. The rotating speed of the forearm drive motor 5 or the pulse numbers for the motor 5 is changed to eliminate such displacment. In other words, the rotating speed of the forearm drive motor 5 is changed or determined to ensure the double angular speed rotation of the forearm member 12 with respect to the arm member 11.

As mentioned above, not only in the case of rotating the arm portion 1 in a circumferential direction but also in the case of expanding or contracting the arm portion 1 in radial direction, this robot arm device uses two drive motors, that is, the drive motor 4 for rotating the arm member 11 and the drive motor 5 for rotating the forearm member 12 carrying the hand member 13.

Comparing with the conventional robot arm devices where the required double rotation of the forearm member 12 relative to the arm member 11 is produced by the two to one diameter ration between the stationary pulley and the forearm drive pulley, accordingly, this robot arm device can move the hand member along a specified radial direction more accurately. This is because of the fact that the rotating speed or angular speed of the forearm drive motor 5 is adjusted so that the forearm member 12 rotates twice faster in the opposite direction than the arm member 11, thereby compensating for a dimensional error which would have been caused in the machining and assembling of belts and pulleys, or an abrasion which would be caused due to long use. It will be apparent that the conventional robot arm devices using only one drive motor for straight radial movement cannot compensate for such dimentional errors.

Also, the use of the two drive motors 4 and 5 makes it possible to set the diameter of the forearm drive pulley 32 freely without considering the diameter ratio relation with the transmission pulley 36. In other words, in the robot arm device of the present invention, it is not necessary to provide a forearm drive pulley whose diameter is definetely half of that of the transmission pulley. Conversely, it is possible to provide the forearm drive pulley 32 having a greater diameter than the transmission pulley 36 which gives a greater torque to the forearm member 12.

In the foregoing embodiment, the diameter ratio between the transmission pulley 36 and the forearm drive pulley 32 is one to one. This one to one ratio is set to simplify the control of the arm and forearm drive motors 4 and 5, and render the transmission and forearm drive pulleys 36 and 32 in contact with the first belt 367 on a half of their respective circumferences.

However, the present invention is not limited to the one to one ratio. It may be possible to desirably set the diameter ratio to two to one, or one to two, or other ratio in consideration of the torque required to rotate the forearm member, output of the arm drive motor 4 and the forearm drive motor 5, and other conditions.

Also, the foregoing embodiment uses the drive transmisison mechanism of belts and pulleys. However, it may be appreciated to use a drive transmission mechanism of chains and sprockets.

Further, all the drive transmission mechanisms are placed within the housings 21, 14, and 15. Accordingly, the likelihood can be prevented that fine dusts produced due to the driving of the motors, belts, and pulleys fly away. This is advantageous in maintaining clean working environment which is required for semiconducter chip production.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A robot arm device comprising:

an expandable arm portion including an arm member, a forearm arm member, and a hand member;

an arm drive wheel fixedly connected at a base end of the arm member;

a transmission mechanism including a transmission wheel disposed coaxially with the arm drive wheel and rotatable independently from the arm drive wheel;

a forearm drive wheel disposed at a leading end of the arm member and rotatable independently from the arm member and fixedly connected at a base end of the forearm member;

a stationary wheel disposed coaxially with the forearm drive wheel and fixedly connected with the arm member;

a hand drive wheel disposed at a leading end of the forearm member, and rotatable independently from the forearm member, and fixedly connected at a base end of the hand member, and having a diameter twice greater than the stationary wheel, and an axis of the hand drive wheel being spaced from an axis of the stationary wheel the same distance as an axis of the forearm drive wheel is spaced from an axis of the arm drive wheel;

an arm drive motor operable to rotate the arm drive wheel;

a forearm drive motor operable to rotate the forearm drive wheel via the transmission mechanism;

a first endless member wound on the transmission wheel and the forearm drive wheel;

a second endless member wound on the stationary wheel and the hand drive wheel; and a controller operable to control the driving of the arm and forearm drive motors to:

rotate the arm and forearm drive motors in the same direction to thereby rotate the arm portion in a specified circumferential direction; and rotate the arm drive motor in a specified direction and rotate the forearm drive motor in the opposite direction at such an angular speed as to rotate the forearm drive wheel twice faster than the arm drive wheel via the transmission mechanism and the first endless member in combination with a relative rotation of the forearm drive wheel due to the rotation of the arm member to thereby move the hand member in a straight radial direction.

2. A robot arm device as defined in claim 1, wherein the forearm drive wheel has the same diameter as the transmission wheel.

3. A robot arm device as defined in claim 2, wherein the arm drive wheel, transmission wheel, forearm drive wheel, stationary wheel, and hand drive wheel each included a pulley, and the first and second endless members are in the form of a belt.

4. A robot arm device as defined in claim 2, wherein the arm member and the forearm member each include a housing in the form of a box, the transmission wheel and the forearm drive wheel are disposed in the housing of the arm member, and the stationary wheel and the hand drive wheel are disposed in the housing of the forearm member.

5. A robot arm device as defined in claim 4, further comprising a housing unit enclosing the arm and forearm drive motors and the arm drive wheel.

6. A robot arm device as defined in claim 5 wherein the arm drive wheel includes a cylinder rotatably mounted on the housing unit by way of a bearing and drivingly connected with the arm drive motor, and the transmission mechanism further includes a drive shaft extending coaxially with the arm drive cylinder and rotatably supported on the arm drive cylinder, and fixedly attached with the transmission wheel at a top end and with a drive wheel drivingly connected with the forearm drive motor.

7. A robot arm device as defined in claim 1, wherein the controller controls the driving of the arm and forearm drive motors by a pulse signal.

* * * * *